United States Patent
Baik et al.

(10) Patent No.: US 9,590,707 B1
(45) Date of Patent: Mar. 7, 2017

(54) USING COMPRESSED BEAMFORMING INFORMATION FOR OPTIMIZING MULTIPLE-INPUT MULTIPLE-OUTPUT OPERATIONS

(71) Applicant: QUALCOMM Incorporated, San Diego, CA (US)

(72) Inventors: Eugene Baik, San Diego, CA (US); Ahmed Ragab Elsherif, Santa Clara, CA (US); Qinghai Gao, Sunnyvale, CA (US); Gregory Steele, Pleasanton, CA (US); Srinivas Katar, Fremont, CA (US); Didier Johannes Richard van Nee, Tull en't Waal (NL); Ehab Tahir, Mississauga (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/842,592

(22) Filed: Sep. 1, 2015

(51) Int. Cl.
*H04K 1/10* (2006.01)
*H04L 27/28* (2006.01)
*H04B 7/04* (2006.01)
*H04L 5/00* (2006.01)
*H04W 16/28* (2009.01)

(52) U.S. Cl.
CPC ......... *H04B 7/0456* (2013.01); *H04B 7/0452* (2013.01); *H04L 5/006* (2013.01); *H04W 16/28* (2013.01)

(58) Field of Classification Search
CPC .. H04B 7/0456; H04B 7/0452; H04B 7/0434; H04B 7/0634; H04L 5/006; H04W 16/28
USPC ....... 375/260, 346, 219, 220, 222, 267, 299, 375/347; 370/329, 338
See application file for complete search history.

(56) References Cited

U.S. PATENT DOCUMENTS

| 7,593,489 B2 | 9/2009 | Koshy et al. |
| 8,320,479 B2 | 11/2012 | Balachandran et al. |
| 8,520,576 B2 | 8/2013 | Kim et al. |

(Continued)

FOREIGN PATENT DOCUMENTS

| WO | WO-2013104428 A1 | 7/2013 |
| WO | WO-2014151546 A1 | 9/2014 |

OTHER PUBLICATIONS

Lv et al., "Low Complexity Scheduling Technique for Multi-User MIMO Systems," 2008 IEEE Vehicular Technology Conference, VTC Spring 2008, Singapore, May 11-14, 2008, pp. 1345-1349, ISBN 978-1-4244-1645-5, Institute of Electrical and Electronics Engineers.

Spencer et al., "Channel Allocation in Multi-user MIMO Wireless Communications Systems," 2004 IEEE International Conference on Communications, Jun. 20-24, 2004, pp. 3035-3039, vol. 5, XP_10709760A, Institute of Electrical and Electronics Engineers.

(Continued)

*Primary Examiner* — Phuong Phu
(74) *Attorney, Agent, or Firm* — Holland & Hart LLP

(57) ABSTRACT

Methods, systems, and devices are described for wireless communication. In one aspect, a method of wireless communication includes receiving, by a first wireless device, compressed beamforming information from each of a plurality of stations, the compressed beamforming information including a feedback signal-to-noise ratio (SNR) value and compressed feedback matrix. The method also includes determining a multi-user signal-to-interference-plus noise ratio (SINR) metric for each of the plurality of stations based at least in part on the received feedback SNR values and the received compressed feedback matrices.

24 Claims, 8 Drawing Sheets

(56) References Cited

U.S. PATENT DOCUMENTS

| | | | |
|---|---|---|---|
| 8,798,184 B2 | 8/2014 | Su et al. | |
| 8,824,386 B2 | 9/2014 | Pare, Jr. et al. | |
| 8,902,921 B2* | 12/2014 | Liu | H04B 7/0452 370/338 |
| 9,055,603 B2 | 6/2015 | Rosenqvist et al. | |
| 2007/0140363 A1* | 6/2007 | Horng | H04B 7/0413 375/260 |
| 2011/0310827 A1* | 12/2011 | Srinivasa | H04B 7/0434 370/329 |
| 2013/0308713 A1* | 11/2013 | Zhang | H04B 7/0634 375/267 |
| 2014/0010080 A1 | 1/2014 | Zubow et al. | |
| 2014/0177747 A1 | 6/2014 | Ruiz et al. | |
| 2014/0185564 A1 | 7/2014 | Dong et al. | |
| 2014/0254517 A1 | 9/2014 | Nam et al. | |
| 2014/0369220 A1 | 12/2014 | Fan et al. | |
| 2016/0345343 A1 | 11/2016 | Elsherif et al. | |

OTHER PUBLICATIONS

Xie et al., "Scalable User Selection for MU-MIMO Networks," IEEE INFOCOM 2014—IEEE Conference on Computer Communications, Toronto, ON, Apr. 27, 2014-May 2, 2014, pp. 808-816, ISBN 978-1-4799-3360-0, Institute of Electrical and Electronics Engineers.

Yi et al., "User Scheduling for Heterogeneous Multiuser MIMO Systems: a Subspace Viewpoint," IEEE Transactions on Vehicular Technology, Aug. 25, 2011, 10 pgs., vol. 60, Issue 8, Institute of Electrical and Electronics Engineers.

ISA/EP, International Search Report and Written Opinion of the International Searching Authority, Int'l Application No. PCT/US2016/046831, Nov. 7, 2016, European Patent Office, Rijswijk. NL, 14 pgs.

\* cited by examiner

USING COMPRESSED BEAMFORMING INFORMATION FOR OPTIMIZING MULTIPLE-INPUT MULTIPLE-OUTPUT OPERATIONS

BACKGROUND

Field of the Disclosure

The present disclosure, for example, relates to wireless communication systems, and more particularly to techniques for using compressed beamforming information for optimizing multiple-input multiple-output (MIMO) operations.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless local area network (WLAN) is an example of a multiple-access system and are widely deployed and used. Other examples of multiple-access systems may include code-division multiple access (CDMA) systems, time-division multiple access (TDMA) systems, frequency-division multiple access (FDMA) systems, and orthogonal frequency-division multiple access (OFDMA) systems.

A WLAN, such as a Wi-Fi (IEEE 802.11) network, may include an access point (AP) that may communicate with one or more stations (STAs) or mobile devices. In some cases, the AP may communicate with more than one STA simultaneously in a multi-user MIMO (MU-MIMO) transmission. The AP may assign a group of STAs to a MU-MIMO group and send a MIMO transmission to the group of STAs assigned to the MU-MIMO group. With opportunistic scheduling, the AP may change the STAs assigned to the MU-MIMO group during every sounding period based on, for example, availability of traffic, modulation and coding scheme (MCS) compatibility, etc. However, when a STA is grouped with other STAs in a MU-MIMO groups that are incompatible (e.g., where each STA in the MU-MIMO group has high channel correlation), the packet error rate (PER) for the MU-MIMO group may increase for the group due to inter-user interference.

SUMMARY

The present description discloses techniques for using compressed beamforming information for optimizing MIMO operations. According to these techniques, a wireless communication device (e.g., an AP or like device) estimates an MU signal-to-interference-plus-noise (SINR) metric for each STA in a candidate MU group. The MU SINR metric for each STA represents an estimate of the SINR that the STA would receive if the wireless communication device were to transmit a MIMO transmission to the candidate MU group. In this regard, expected interference associated with the MIMO transmission to the other STAs of the candidate MU group is determined and factored into the MU SINR metric for a particular STA.

For example, an AP performs a channel sounding procedure and receives compressed beamforming information from a number of STAs (e.g., two through eight STAs in some implementations). The compressed beamforming information associated with each STA responding to the channel sounding includes a feedback signal-to-noise ratio (SNR) value and a compressed feedback matrix. The AP selects some or all of the number of STAs as a candidate MU group and determines an MU SINR metric for each STA in the candidate MU group. In some cases, the AP selects multiple combinations of the number of STAs (e.g., each permutation of a candidate MU-2, MU-3, and MU-4 groups or some subset of the permutations thereof) and determines the MU SINR metrics for the STAs in each of the candidate MU groups. The AP forms an MU transmission group based at least in part on the determined multi-user SINR metrics of the STAs in the candidate MU group(s).

The MU SINR metric for a particular STA is based at least in part on the received feedback SNR values and the received compressed feedback matrices associated with the STAs in a candidate MU group. For example, the MU SINR metric for a first STA in the candidate MU group is determined based in part using beamforming weights associated with the spatial stream(s) (and the estimated interference caused therefrom) intended for transmission to the other STA(s) of the candidate MU group. Thus, a particular STA can have different MU SINR metrics based on a determination of two different candidate MU groups, each including that particular STA. In some examples, the AP determines a beamforming steering matrix associated with a candidate MU group. The beamforming steering matrix is based at least in part on the received SNR values and received compressed feedback matrices associated with the STAs in the candidate MU group. The multi-user SINR metric for each STA is, in turn, determined based at least in part on the determined beamforming steering matrix associated with the candidate MU group.

In some implementations, the AP performs a subsequent channel sounding procedure using the beamforming steering matrix determined from the compressed beamforming information corresponding to the initial sounding procedure. The compressed beamforming information received by the AP in response to the subsequent channel sounding procedure is used to validate and/or further refine the MU SINR metrics of the STAs in the candidate MU group from which the beamforming steering matrix was determined.

A method for wireless communication is described. In some examples, the method includes receiving, by a first wireless device, compressed beamforming information from each of a plurality of stations, the compressed beamforming information including a feedback SNR value and compressed feedback matrix, and determining a multi-user SINR metric for each of the plurality of stations based at least in part on the received feedback SNR values and the received compressed feedback matrices.

A communication device is described. In some example, the communication device includes a transceiver to receive compressed beamforming information from each of a plurality of stations, the compressed beamforming information including a feedback SNR value and compressed feedback matrix, a multi-user SINR estimator to determine a multi-user SINR metric for each of the plurality of stations based at least in part on the received feedback SNR values and the received compressed feedback matrices.

Another communication device includes means for receiving compressed beamforming information from each of a plurality of stations, the compressed beamforming information including a feedback SNR value and compressed feedback matrix, and means for determining a multi-user SINR metric for each of the plurality of stations based at least in part on the received feedback SNR values and the received compressed feedback matrices.

A non-transitory computer-readable medium is described. The non-transitory computer-readable medium includes computer-readable code that, when executed, causes a device to receive compressed beamforming information from each of a plurality of stations, the compressed beamforming information including a feedback SNR value and compressed feedback matrix, and determine a multi-user SINR metric for each of the plurality of stations based at least in part on the received feedback SNR values and the received compressed feedback matrices.

Regarding the above-described method, communication devices, and non-transitory computer-readable medium, a multi-user transmission group can be formed from the plurality of stations based at least in part on the determined multi-user SINR metrics.

Determining the multi-user SINR metric for each of the plurality of stations can further comprise determining a beamforming steering matrix based at least in part on the received SNR values and received compressed feedback matrices, and determining the multi-user SINR metric for each of the plurality of stations based at least in part on the determined beamforming steering matrix. A subsequent channel sounding procedure can be performed using the determined beamforming steering matrix.

Determining the multi-user SINR metric for a first station of the plurality of stations can include using beamforming weights associated with a spatial stream to a second station of the plurality of stations.

The compressed feedback matrices can be decompressed based at least in part on angles associated with the compressed feedback matrix for each of the plurality of stations.

An MCS can be set for each of the plurality of stations based at least in part on the determined multi-user SINR metrics Further scope of the applicability of the described systems, methods, devices, or computer-readable media will become apparent from the following detailed description, claims, and drawings. The detailed description and specific examples are given by way of illustration only, and various changes and modifications within the scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
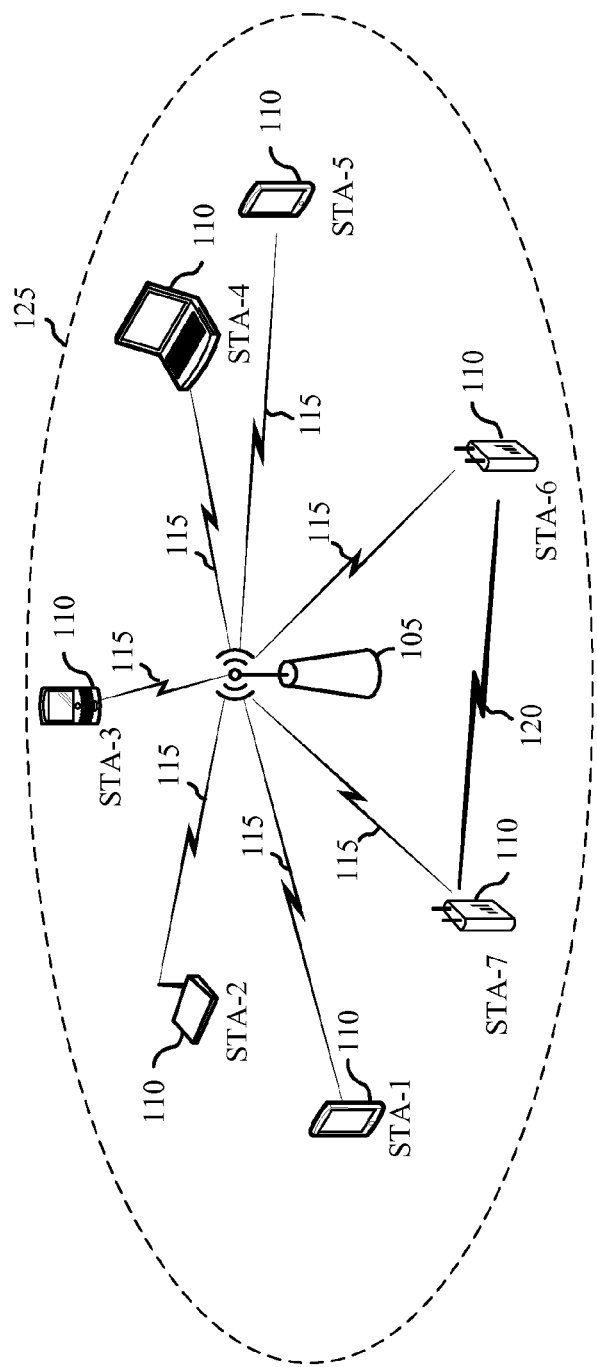
FIG. 1 illustrates an example of a wireless communication system, such as a WLAN, that supports using compressed beamforming information for optimizing MIMO operations in accordance with various aspects of the present disclosure.

According to aspects of the present disclosure, a wireless communication device, such as an access point (AP) utilizes techniques for using compressed beamforming information for optimizing multiple-input multiple-output (MIMO) operations. The AP estimates a multi-user (MU) signal-to-interference-plus-noise (SINR) metric for each station (STA) in a candidate MU group and uses the MU SINR metrics with respect to various MIMO operations. The AP determines the MU SINR metric a particular STA based at least in part on compressed beamforming information associated with each STA in the candidate MU group.

The compressed beamforming information used by the AP to determine the MU SINR metrics includes feedback signal-to-noise ratio (SNR) values and compressed feedback matrices. An MU SINR metric for a particular STA is based at least in part on the received feedback SNR values and the received compressed feedback matrices associated with the STAs in a candidate MU group. The AP decompresses the compressed feedback matrices based at least in part on angles (e.g., phi $\Phi$ and psi $\Psi$ angles) associated with the rows and columns of the compressed feedback matrix to obtain a feedback matrix for each STA.

With the feedback matrix for each STA in a candidate MU group, the AP determines a beamforming steering matrix associated with the candidate MU group in accordance with some implementations. The beamforming steering matrix is based at least in part on the received SNR values and received compressed feedback matrices, which have been decompressed to obtain feedback matrices of the STAs in the candidate MU group. The multi-user SINR metric for each STA is, in turn, determined based at least in part on the determined beamforming steering matrix associated with the candidate MU group.

The MU SINR metrics for the STAs provide the AP with estimations of the different levels of channel correlation and associated inter-user interference that a particular STA may experience if that particular STA were to be included in various possible MIMO transmission groupings. As such, the AP forms efficient MU groups of STAs for MIMO transmissions as well as accurately determines a proper modulation and coding scheme (MCS) for each STA in the corresponding MU transmission group.

By contrast, certain conventional APs solely utilize packet error rate (PER) history to decide the MCS to be utilized for a STA in a MIMO group. However, if a STA joins a poor MU group (e.g., having large channel correlation and inter-user interference during the MIMO transmission), the resulting PER for that transmission occurrence can significantly impact the PER history and improperly lower MCS for that STA. If that STA then joins a good MU group (e.g., having small channel correlation and negligible inter-user interference during the MIMO transmission), that STA can still use an artificially low MCS based on the PER-based rate adaptation practices associated with a conventional AP.

Advantageously, an AP in accordance with aspects of the present disclosure sets the MCS of a particular STA based at least in part on the MU SINR metrics associated with candidate MU group(s). Moreover, the AP determines a correlation metric based at least in part on the MU SINR metrics. For example, the correlation metric can be an average, median, or mean distribution of the MU SINR metrics of the STAs for a candidate MU group. As such, the AP uses the correlation metric to determine whether the candidate MU group is an efficient MIMO transmission and whether to remove one or more STAs from the candidate MU group. Correlation metrics relating to multiple candidate transmission groups are analyzed by the AP to detect changes and patterns associated with channel correlations among the STAs and form efficient MU transmission groups. In this regard, the AP uses the MU SINR metrics and correlation metrics to optimize MCS rate adaptation, MU grouping of STAs, MU transmission group ranking and scheduling, etc.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a wireless local area network (WLAN) 100 in accordance with various aspects of the present disclosure. The WLAN 100 includes an access point (AP) 105 and STAs 110 labeled as STA-1 through STA-7. The STAs 110 can be mobile handsets, tablet computers, personal digital assistants (PDAs), other handheld devices, netbooks, notebook computers, tablet computers, laptops, desktop computers, display devices (e.g., TVs, computer monitors, etc.), printers, etc. While only one AP 105 is illustrated, the WLAN 100 can alternatively have multiple APs 105. STAs 110, can also be referred to as a mobile stations (MS), mobile devices, access terminals (ATs), user equipment (UEs), subscriber stations (SSs), or subscriber units. The STAs 110 associate and communicate with the AP 105 via a communication link 115. Each AP 105 has a coverage area 125 such that STAs 110 within that area are within range of the AP 105. The STAs 110 are dispersed throughout the coverage area 125. Each STA 110 may be stationary or mobile. Additionally, each AP 105 and STA 110 can have multiple antennas.

While, the STAs 110 are capable of communicating with each other through the AP 105 using communication links 115, STAs 110 can also communicate directly with each other via direct wireless communication links 120. Direct wireless communication links can occur between STAs 110 regardless of whether any of the STAs is connected to an AP 105. As such, a STA 110 or like device can include techniques for using compressed beamforming information for optimizing MIMO operations as described herein with respect to an AP 105.

The STAs 110 and AP 105 shown in FIG. 1 communicate according to the WLAN radio and baseband protocol including physical (PHY) and medium access control (MAC) layers from IEEE 802.11, and its various versions including, but not limited to, 802.11b, 802.11g, 802.11a, 802.11n, 802.11ac, 802.11ad, 802.11ah, 802.11z, etc. Thus, WLAN 100 implements a contention-based protocol that allows a number of devices (e.g., STAs 110 and APs 105) to share the same wireless medium (e.g., a channel) without pre-coordination. To prevent several devices from transmitting over the channel at the same time each device in a BSS operates according to certain procedures that structure and organize medium access, thereby mitigating interference between the devices.

In WLAN 100, AP 105 utilizes techniques for using compressed beamforming information (e.g., very high throughput (VHT) compressed beamforming (CBF) report information) for optimizing MIMO operations. AP 105 utilizes certain transmission techniques such as MIMO and MU-MIMO. A MIMO communication typically involves multiple transmitter antennas (e.g., at an AP 105) sending a signal or signals to multiple receive antennas (e.g., at a STA 110). Each transmitting antenna transmits independent data (or spatial) streams to increase spatial diversity and the likelihood successful signal reception. In other words, MIMO techniques use multiple antennas on AP 105 and/or multiple antennas on a STA 110 in the coverage area 125 to take advantage of multipath environments to transmit multiple data streams.

AP 105 also implements MU-MIMO transmissions in which AP 105 simultaneously transmits independent data streams to multiple STAs 110. In one example of an MU-N transmission (e.g., MU-2, MU-3, MU-4, etc.), an AP 105 simultaneously transmits signals to N STAs. Thus, when AP 105 has traffic for many STAs 110, the AP 105 increases network throughput by aggregating individual streams for each STA 110 in the group into a single MU-MIMO transmission.

In implementing various MU-MIMO techniques and operations, AP 105 (e.g., beamformer device) relies on multi-user channel sounding procedures performed with the STAs 110 (e.g., beamformee devices) in the coverage area 125 to determine how to radiate energy in a preferred direction. AP 105 sounds the channel by transmitting null data packet announcement (NDPA) frames and null data packet (NDP) frames to a number of STAs 110 such as STA-1, STA-2, STA-3, STA-4, STA-5, and STA-6. AP 105 has knowledge that STA-7 does not support MU-MIMO operations, for instance, and does not include STA-7 in the multi-user channel sounding procedure.

AP 105 also transmits a beamforming report poll frame after the NDPA and NDP frames to coordinate and collect responses from the number of STAs 110. Each of the STAs 110 responds in turn with a compressed beamforming action frame (e.g., a VHT CBF frame) for transmitting VHT CBF feedback to AP 105. The VHT CBF feedback contains the VHT CBF report information, portions of which the AP 105 uses to determine MU SINR metrics for the number of STAs 110.

The VHT CBF report information includes feedback information such as compressed beamforming feedback matrix V compressed in the form of angles (i.e., phi $\Phi$ and psi $\Psi$ angles) that are quantized according to a standard (e.g., IEEE 802.11ac). The VHT CBF report information also includes a feedback signal-to-noise ratio (SNR) value (e.g., an Average SNR of Space-Time Stream Nc, where Nc is the number of columns in the compressed beamforming feedback matrix V). Each SNR value per tone in stream i (before being averaged) corresponds to the SNR associated with the column i of the beamforming feedback matrix V determined at the STA 110. The feedback SNR values are based on the NDP frames in the channel sounding procedure, and therefore each of these feedback SNR values generally corresponds to a SNR that a particular STA 110 may experience in a single-user (SU) transmission from AP 105 to the particular STA 110.

AP 105 collects the VHT CBF report information from each STA 110 and uses the feedback information to determine the SINR metrics and beamforming steering matrices in some examples. It is to be understood that the multi-user channel sounding procedures described herein are provided as non-limiting examples. Other channel sounding procedures for obtaining compressed beamforming information can be used for optimizing MIMO operations as would be apparent to a skilled person given the benefit of the present disclosure.

Figure 2:
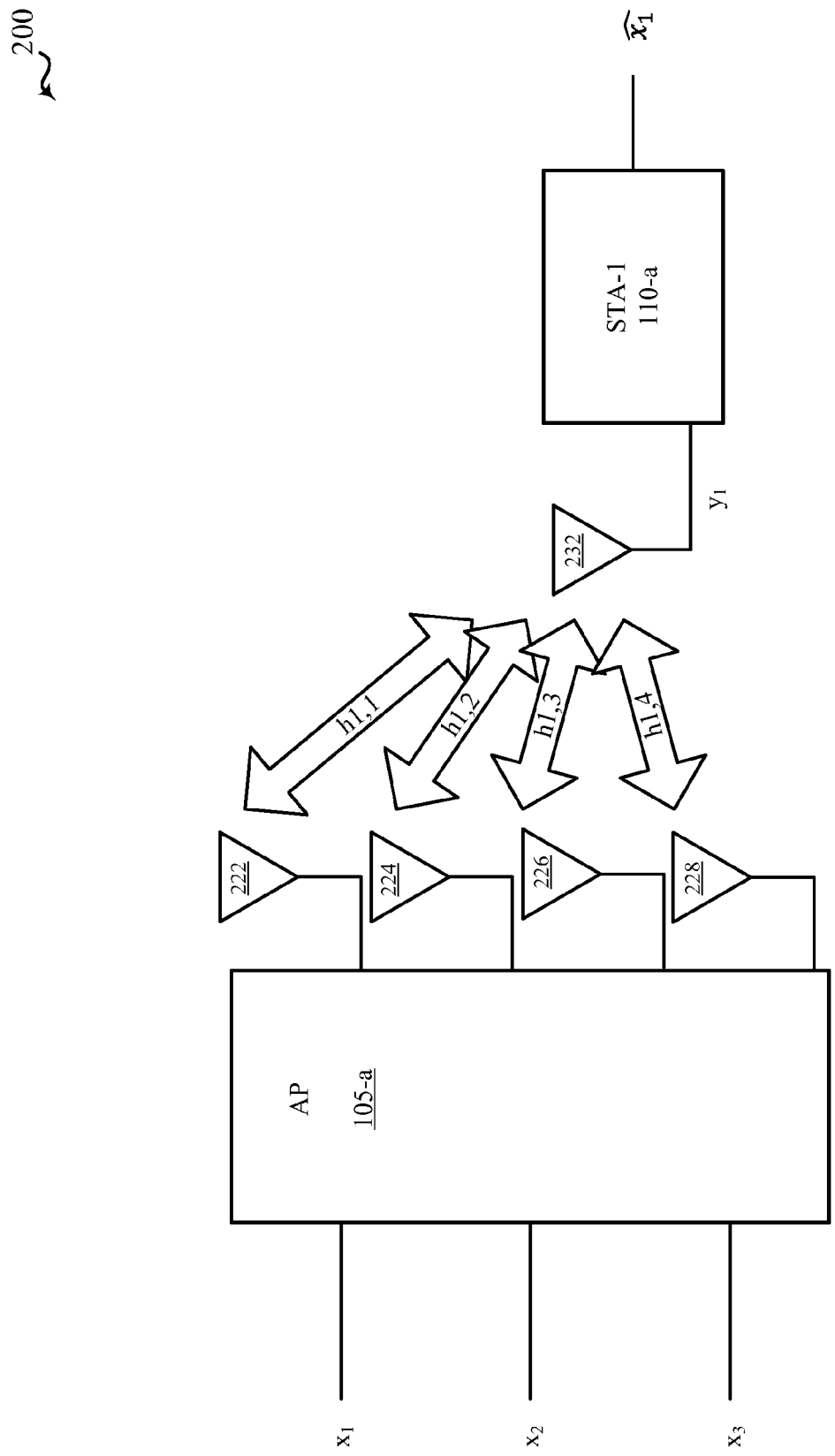
FIG. 2 illustrates an example wireless communications scenario in which a beamformer wireless device determines an MU SINR metric associated with a beamformee wireless device in accordance with various aspects of the present disclosure.

FIG. 2 illustrates an example wireless communications scenario 200 in which a beamformer wireless device determines an MU SINR metric associated with a beamformee wireless device in accordance with various aspects of the present disclosure. The example wireless communications scenario 200 shown in FIG. 2 is illustrated with respect to AP 105-*a* and STA 110-*a*, which are respective examples of the AP 105 and STAs 110 of FIG. 1. In this example, AP 105-*a* has received VHT CBF report information from each STA 110, STA-1 (depicted as STA 110-*a* in FIG. 2), STA-2, STA-3, STA-4, STA-5, and STA-6, as described with respect to FIG. 1. AP 105-*a* has determined to analyze a candidate MU-MIMO group consisting of STA-1, STA-2, and STA-3.

In the example wireless communications scenario 200, the number of user is 3, the number of space-time streams ($N_{STS}$) per user is 1, the number of transmit antennas ($N_{tx}$) at AP 105-*a* is 4, and the number of receive antennas ($N_{rx}$) at STA-1 110-*a* is 1. Symbols propagate from transmit antennas 222, 224, 226, 228 of AP 105-*a* to receive antenna 232 of STA-1 110-*a* by way of four separate radio paths: channel element h1,1 from first transmit antenna 222 to receive antenna 232; channel element h1,2 from second transmit antenna 224 to receive antenna 232; channel element h1,3 from third transmit antenna 226 to receive antenna 232; and channel element h1,4 from fourth transmit antenna 228 to receive antenna 232. The received signals can be expressed as follows:

$$\begin{bmatrix} y_1 \\ y_2 \\ y_3 \end{bmatrix} = H \cdot W \cdot \begin{bmatrix} x_1 \\ x_2 \\ x_3 \end{bmatrix} + n$$

where $x_1$, $x_2$, and $x_3$ are the signals for STA-1, STA-2, and STA-3, respectively, sent from the transmit antennas 222, 224, 226, 228 of AP 105-*a*; $y_1$, $y_2$, and $y_3$ are the signals that arrive at the receive antenna 232 of STA-1 110-*a*, the receive antenna of STA-2, and the receive antenna of STA-3, respectively. H expresses the way in which the transmitted symbols are attenuated, phase-shifted, distorted, etc. as the symbols travel from the transmit antennas to the receive antennas. W represents the beamforming steering matrix to transmit signals $x_1$, $x_2$, and $x_3$ as determined using the compressed beamforming information received by AP 105-*a* during the channel sounding procedure, and n represents the received noise and interference.

Thus, $y_1$ can be expressed as follows:

$$y_1 = [- \ h_1 \ -] \cdot \begin{bmatrix} | & | & | \\ w_1 & w_2 & w_3 \\ | & | & | \end{bmatrix} \cdot \begin{bmatrix} x_1 \\ x_2 \\ x_3 \end{bmatrix} + n$$

$$= h_1 w_1 x_1 + h_1 w_2 x_2 + h_1 w_3 x_3 + n$$

The expected value $\widehat{x_1}$ is the estimate of the transmitted signal $x_1$ as would be receive by STA-1 110-*a*, and can be determined as follows:

$$\hat{x}_1 = \frac{(h_1 w_1)^* y_1}{|h_1 w_1|^2}$$

while the mean square error (MSE) can be expressed as follows:

$$\text{MSE} = \mathbb{E}\{(\hat{x}-x)(\hat{x}-x)^*\}$$

Thus, the mean square error can be written as follows:

$$MSE = \frac{\frac{s_1^2}{3}|v_1^* w_2|^2 + \frac{s_1^2}{3}|v_1^* w_3|^2 + 1}{s_1^2 |v_1^* w_1|^2}$$

where $s_1$ is the feedback SNR value $v_1^*$ is the decompressed or decomposed feedback matrix from compressed beamforming feedback matrix V from the compressed beamforming information provided by STA-1 during the channel sounding procedure. The beamforming steering matrix components (e.g., beamforming weights) $w_1$, $w_2$, and $w_3$ of beamforming steering matrix W are likewise determined using the compressed beamforming information provided by STA-1, STA-2, and STA-3 during the channel sounding procedure.

AP 105-*a* can then determine an MU SINR metric as would be observed by STA-1 110-*a* if AP 105-*a* were to transmit an MU-MIMO transmission to the MU-MIMO group consisting of STA-1, STA-2, and STA-3. The MU SINR metric ($SINR_{est}$) associated with STA-1 can be determined as follows:

$$SINR_{est} = \frac{\mathbb{E}\{x_1^2\}}{MSE} = \frac{\frac{s_1^2}{3}|v_1^* w_1|^2}{\frac{s_1^2}{3}(|v_1^* w_2|^2 + |v_1^* w_3|^2) + 1}$$

Similar MU SINR metrics can be determined by AP 105-*a* as would be observed by each of STA-2 and STA-3. For example, the MU SINR metric as would be observed by STA-2 if AP 105-*a* were to transmit an MU-MIMO transmission to the MU-MIMO group consisting of STA-1, STA-2, and STA-3 can be determined as follows:

$$SINR_{est} = \frac{\frac{s_2^2}{3}|v_2^* w_2|^2}{\frac{s_2^2}{3}(|v_2^* w_1|^2 + |v_2^* w_3|^2) + 1}$$

The MU SINR metric as would be observed by STA-3 if AP 105-*a* were to transmit an MU-MIMO transmission to the MU-MIMO group consisting of STA-1, STA-2, and STA-3 can be determined as follows:

$$SINR_{est} = \frac{\frac{s_3^2}{3}|v_3^* w_3|^2}{\frac{s_3^2}{3}(|v_3^* w_1|^2 + |v_3^* w_2|^2) + 1}$$

Characteristics of the disclosed equations for the MU SINR metrics ($SINR_{est}$) and similar techniques as would be apparent to a skilled person given the benefit of the present disclosure include, but are not limited to: using beamforming weights associated with a spatial stream to other STAs (e.g., a second STA, a third STA, a fourth STA, etc.) to determine the MU SINR metric for a first STA; using interference estimates associated with spatial streams from other STAs in MU-MIMO transmission at a detriment to the MU SINR metric of a first STA; and using a single-user SNR value of a first STA with interference estimates of other STAs to determine the MU SINR metric of the first STA.

Moreover, in addition to the actual values calculated using the disclosed equations, some examples of the MU SINR metric include weightings of the various components and/or approximations as determined by AP 105-*a* associated with various wireless environments and/or operational conditions.

In some embodiments, AP 105-*a* does not calculate the beamforming steering matrix W for the purpose of analyzing candidate MU-MIMO groups. Instead, AP 105-*a* utilizes a default value or a historical value (e.g., derived from the same or similar STAs under like conditions) for the beamforming steering matrix W and beamforming steering matrix components $w_1$, $w_2$, and $w_3$. For example, AP 105-*a* determines that an approximation of beamforming steering matrix W can be used based at least in part on a comparison of the received compressed beamforming information corresponding to a present MU SINR metric determination with previously received compressed beamforming information. As such, the beamforming steering matrix W determined under comparable feedback information or used for actual MU-MIMO transmission of the same or similar MU-MIMO groups of STAs can be used as an approximation of beamforming steering matrix W for the MU SINR metric calculations. In yet other embodiments, AP 105-*a* entirely eliminates the beamforming steering matrix W and beamforming steering matrix components $w_1$, $w_2$, and $w_3$ from for the MU SINR metric calculations, for example, by directly using the channel feedback values, $s_1v_1$, $s_2v_2$, and $s_3v_3$, respectively, in their places in the described calculations. Such embodiments approximating or eliminating the beamforming steering matrix W from the MU SINR metric calculations can be used, for example, when temporary computational constraints exist within AP 105-*a* (e.g., in certain instances where computing an minimum mean square error (MMSE)-optimized beamforming steering matrix W is costly and/or too time intensive).

Example wireless communications scenario 200 represents one of many combinations of STAs 110 the AP 105-*a* may analyze for determining effective MU-MIMO transmission groups with which to transmit data to the number of STAs 110. In one example, AP 105-*a* determines MU SINR metrics and analyzes candidate MU-MIMO groups comprised of STA-2 and STA-3 as a possible MU-2 group, STA-1, STA-5, and STA-6 as a possible MU-3 group, and STA-3, STA-4, STA-5, and STA-6 as a possible MU-4 group.

In this example, AP 105-*a* determines a correlation metric among the MU SINR metrics of STA-3, STA-4, STA-5, and STA-6 as the candidate MU-4 group, and determines the MU SINR metric of STA-5 is significantly lower (e.g., by one or two standard deviations from the median of all SINR metrics of the candidate MU-4 group). As such, AP 105-*a* removes STA-5 from the candidate MU-4 group thereby reducing the size of the candidate MU-MIMO group to a new candidate MU-3 group. AP 105-*a* now determines MU SINR metrics of STA-3, STA-4, and STA-6 as the new candidate MU-3 group, and determines the MU SINR metrics of each of STA-3, STA-4, and STA-6 have increased over their respective MU SINR metrics in the former candidate MU-4 group that included STA-5. AP 110-*a* then blacklists STA-5 from MU-MIMO transmission groupings with any of STA-3, STA-4, and STA-6 for a predetermined period of time (e.g., 500 ms, 5 second, 30 seconds, 2 minutes, 5 minutes, etc.).

In this regard, a goal of analyzing various candidate MU-MIMO groups is to determine channel correlation patterns among the STAs 110 and identity groups of STAs 110 that exhibit good uncorrelated channel characteristics so as to form efficient MU-MIMO transmission groups. In this instance, each STA 110 in an efficient MU-MIMO transmission group exhibits a high MU SINR metric. The high MU SINR metrics of the STAs in such an efficient MU-MIMO transmission group are also correlated to high achievable high MCS rates.

Figure 3A:
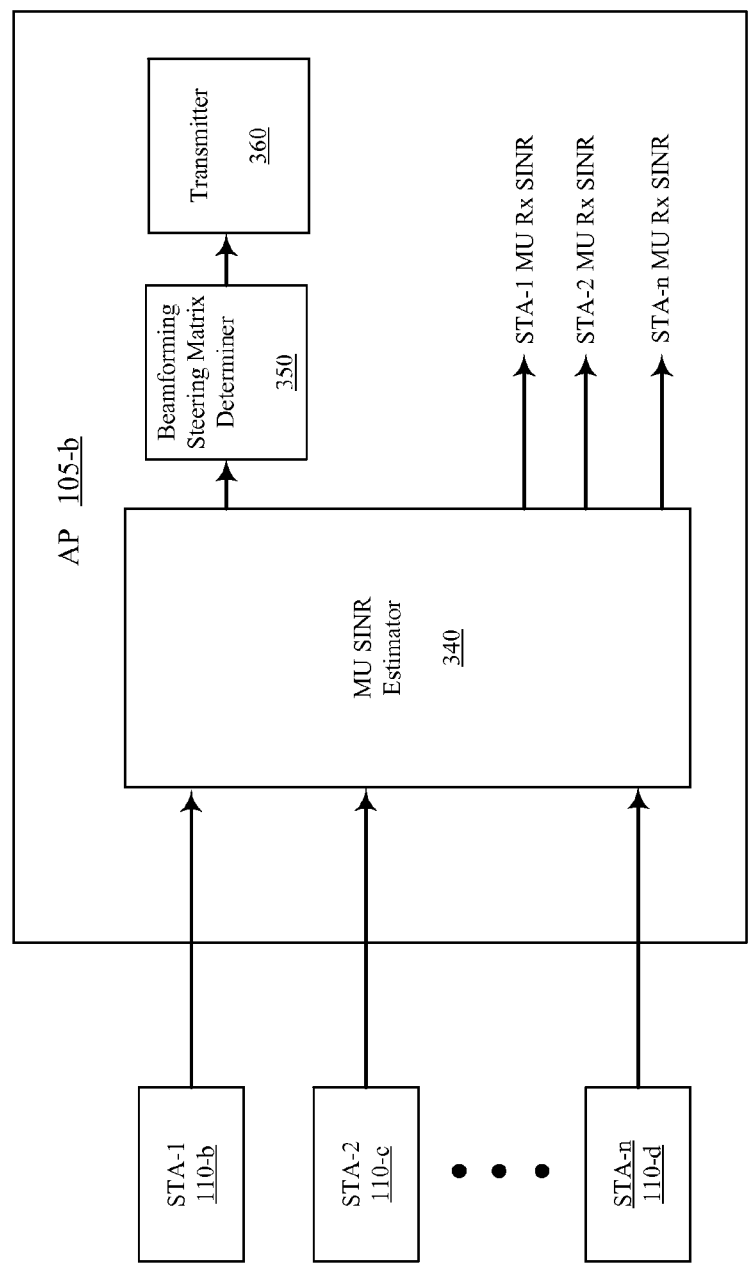
FIGS. 3A-3C show block diagrams of examples of APs receiving compressed beamforming information from STAs and using the received compressed beamforming information for optimizing MIMO operations in accordance with various aspects of the present disclosure.

FIG. 3A shows a block diagram 300-*a* of example of an AP receiving compressed beamforming information from STAs and using the received compressed beamforming information for optimizing MIMO operations in accordance with various aspects of the present disclosure. The example block diagram 300-*a* shown in FIG. 3A is illustrated with respect to AP 105-*b* and STAs 110-*b*, 110-*c*, 110-*d*, which are respective examples of the AP 105 and STAs 110 of FIGS. 1 and 2.

Each of STA-1 110-*b*, STA-2 110-*c*, and STA-n 110-*d* transmits compressed beamforming information to AP 105-*b*. MU SINR estimator 340 of AP 105-*b* processes the received compressed beamforming information to determine a MU SINR metric for each of STA-1 110-*b*, STA-2 110-*c*, and STA-n 110-*d* as a candidate MU-MIMO group. The MU SINR metric for each of STA-1 110-*b*, STA-2 110-*c*, and STA-n 110-*d* is determined as an estimate of the SINR that the respective STA would receive if AP 105-*c* were to transmit a MU-MIMO transmission to the candidate MU-MIMO group of STA STA-1 110-*b*, STA-2 110-*c*, and STA-n 110-*d*. As such, the interference associated with the calculated MU SINR metric of a particular STA 110 relates to interference that would be caused by the packets simultaneously transmitted to the other stations in a MU-MIMO transmission.

In some cases, MU SINR estimator 340 of AP 105-*b* also determines an additional MU SINR metric for each of STA-1 110-*b*, STA-2 110-*c*, and STA-n 110-*d* using different candidate MU-MIMO groups. These different candidate MU-MIMO groups include various MU-2, MU-3, MU-4, etc. group combinations of STA-1 110-*b*, STA-2 110-*c*, and STA-n 110-*d*.

In this example, MU SINR estimator 340 does not use a beamforming steering matrix W to calculate MU SINR metrics. For example, a null value, default value, or historical value for beamforming steering matrix W (e.g., as previously determined by beamforming steering matrix determiner 350) is used in the calculations of the MU SINR metrics.

Additionally, MU SINR estimator 340 of AP 105-*b* is configured to perform single-user MIMO operations in some embodiments. For example, single-user MIMO transmission parameters ($N_{ss}$, MCS) for a STA 110 are based on feedback information contained in a CBF report received from that STA 110. For each spatial stream, AP 105-*b* maps the received SNR value to a bits per second (bps) value using a constrained capacity formula such as $C=\max(\log(1+SNR), 8)$. In implementations where AP 105-*b* must transmit using a single MCS to all spatial streams, AP 105-*b* selects a minimum MCS over selection of multiple spatial streams. AP 105-*b* can choose to transmit at $N_{ss}=1, \ldots, N_{ss\_total}$, and selects $N_{ss}$ such that a total throughput rate is maximized among the combinations of single-user MIMO transmission parameters ($N_{ss}$, MCS) for the STA 110.

When AP 105-*b* determines an MU-MIMO transmission group based at least in part on the determined MU SINR metrics, a beamforming steering matrix W is determined by beamforming steering matrix determiner 350, and the MU-MIMO transmission is performed by transmitter 360.

Figure 3B:
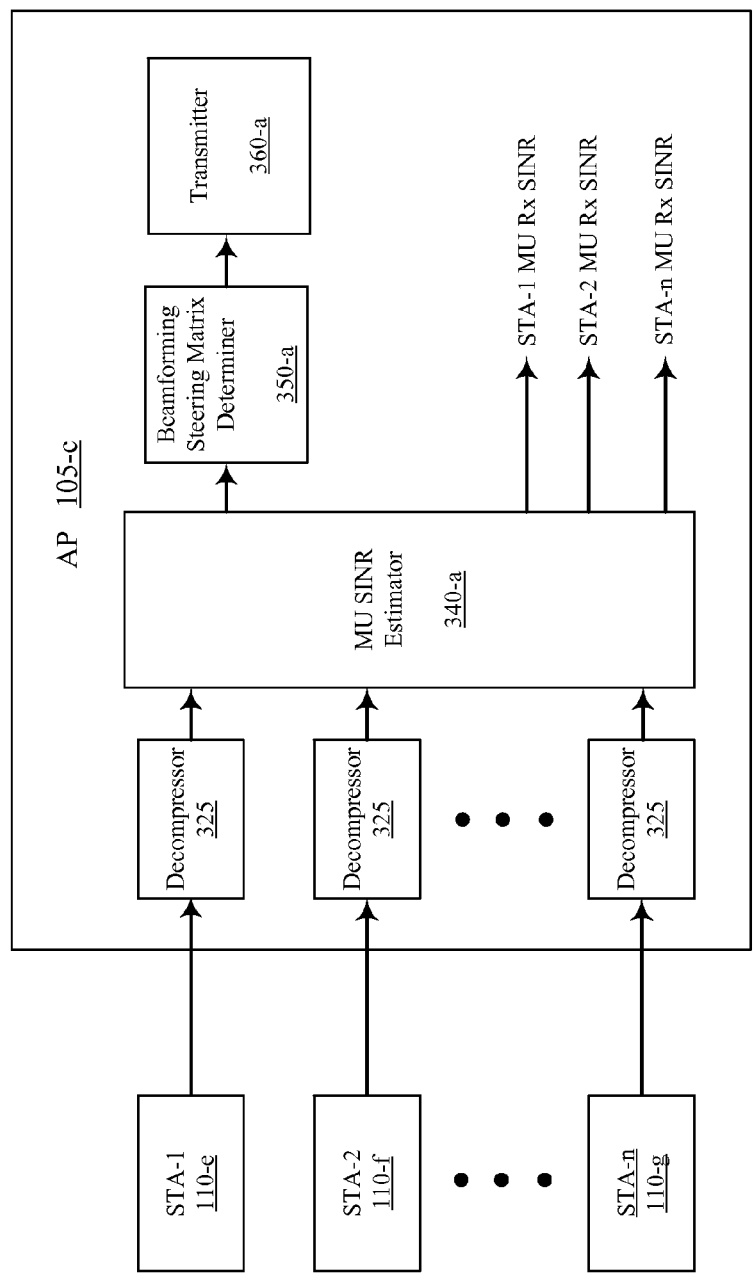

FIG. 3B shows a block diagram 300-*b* of example of an AP receiving compressed beamforming information from STAs and using the received compressed beamforming information for optimizing MIMO operations in accordance with various aspects of the present disclosure. The example block diagram 300-*b* shown in FIG. 3B is illustrated with respect to AP 105-*c* and STAs 110-*e*, 110-*f*, 110-*g*, which are respective examples of the AP 105 and STAs 110 of FIGS. 1 2, and 3A.

Each of STA-1 110-*e*, STA-2 110-*f*, and STA-n 110-*g* transmits compressed beamforming information to AP 105-*c*. Decompressor(s) 325 of AP 105-*c* decompresses the received compressed beamforming information. For example, decompressor 325 of AP 105-*c* decompresses compressed feedback matrices based at least in part on angles (e.g., phi Φ and psi Ψ angles) associated with the rows and columns of each compressed feedback matrix V to obtain a decompressed beamforming matrix (e.g., feedback matrix V*) for each of STA-1 110-*e*, STA-2 110-*f*, and STA-n 110-*g*.

MU SINR estimator 340-*a* of AP 105-*c* processes decompresses compressed feedback matrices and other received compressed beamforming information to determine a MU SINR metric for each of STA-1 110-*e*, STA-2 110-*f*, and STA-n 110-*g* as a candidate MU-MIMO group. In some cases, MU SINR estimator 340-*a* of AP 105-*c* also determines an additional MU SINR metric for each of STA-1 110-*e*, STA-2 110-*f*, and STA-n 110-*g* using different candidate MU-MIMO groups. These different candidate MU-MIMO groups include various MU-2, MU-3, MU-4, etc. group combinations of STA-1 110-*e*, STA-2 110-*e*, and STA-n 110-*g*.

When AP 105-*c* determines an MU-MIMO transmission group based at least in part on the determined MU SINR metrics, a beamforming steering matrix W is determined by beamforming steering matrix determiner 350-*a*, and the MU-MIMO transmission is performed by transmitter 360-*a*.

Figure 3C:
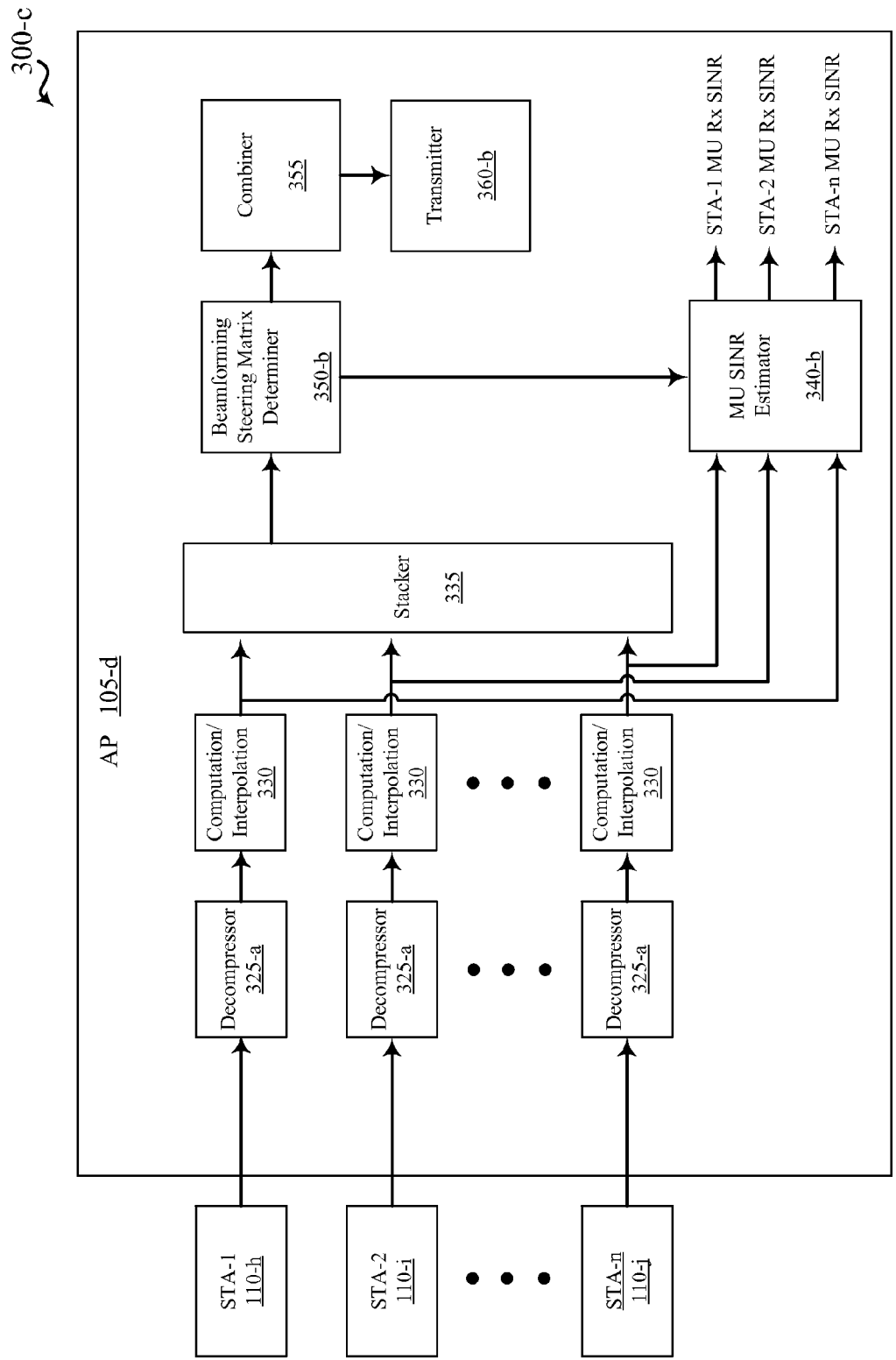

FIG. 3C shows a block diagram 300-*c* of example of an AP receiving compressed beamforming information from STAs and using the received compressed beamforming information for optimizing MIMO operations in accordance with various aspects of the present disclosure. The example block diagram 300-*c* shown in FIG. 3A is illustrated with respect to AP 105-*d* and STAs 110-*h*, 110-*i*, 110-*j*, which are respective examples of the AP 105 and STAs 110 of FIGS. 1, 2, 3A, and 3B.

Each of STA-1 110-*h*, STA-2 110-*i*, and STA-n 110-*j* transmits compressed beamforming information to AP 105-*d*. Decompressor(s) 325-*a* of AP 105-*d* decompresses the received compressed beamforming information. For example, decompressor 325-*a* of AP 105-*d* decompresses compressed feedback matrices based at least in part on angles (e.g., phi Φ and psi Ψ angles) associated with the rows and columns of each compressed feedback matrix V to obtain a decompressed beamforming matrix (e.g., feedback matrix V*) for each of STA-1 110-*h*, STA-2 110-*i*, and STA-n 110-*j*. In doing so, decompressor(s) 325-*a* of AP 105-*d* decompress the received compressed feedback matrices (e.g., regenerate the feedback matrices V*) by using a matrix multiplication operation called a Givens rotation.

Computation/interpolation blocks 330 of AP 105-*d* receive the decompresses compressed feedback matrices and other received compressed beamforming information (e.g., feedback SNR values and feedback matrices V*). The computation/interpolation blocks 330 perform various, filtering, coding, and phase-shifting operations and forwards the feedback information to both the MU SINR estimator 340-*b* and stacker 335. Stacker 335 stacks the feedback SNR values and feedback matrices V* and forwards the results to beamforming steering matrix determiner 350-*b*. Beamforming steering matrix determiner 350-*b* determines beamforming steering matrix W associated with a MU-MIMO transmission of STA-1 110-*h*, STA-2 110-*i*, and STA-n 110-*j*. Beamforming steering matrix determiner 350-*b* provides the beamforming steering matrix W to MU SINR estimator 340-*b*, which in turn determines a MU SINR metric for each of STA-1 110-*h*, STA-2 110-*i*, and STA-n 110-*j* based at least in part on the beamforming steering matrix W.

When AP 105-*d* determines the MU-MIMO transmission group based at least in part on the determined MU SINR metrics, the corresponding beamforming steering matrix W of the selected MU-MIMO transmission group is forwarded to combiner 355. Combiner 355 performs cyclic shift diversity operations, and the MU-MIMO transmission is performed by transmitter 360-*b*.

It is to be appreciated that the block diagrams 300-*a*, 300-*b*, 300-*c* of FIGS. 3A-3C are some examples of APs 105 that use compressed beamforming information to optimize MIMO operations, and other wireless communication devices can implement the techniques described herein. Wireless communication devices (including APs 105) determine MU SINR metrics and correlation metrics to optimize MCS rate adaptation, MU grouping of STAs, MU transmission group ranking and scheduling, etc. as well as other MIMO operations.

Figure 4A:
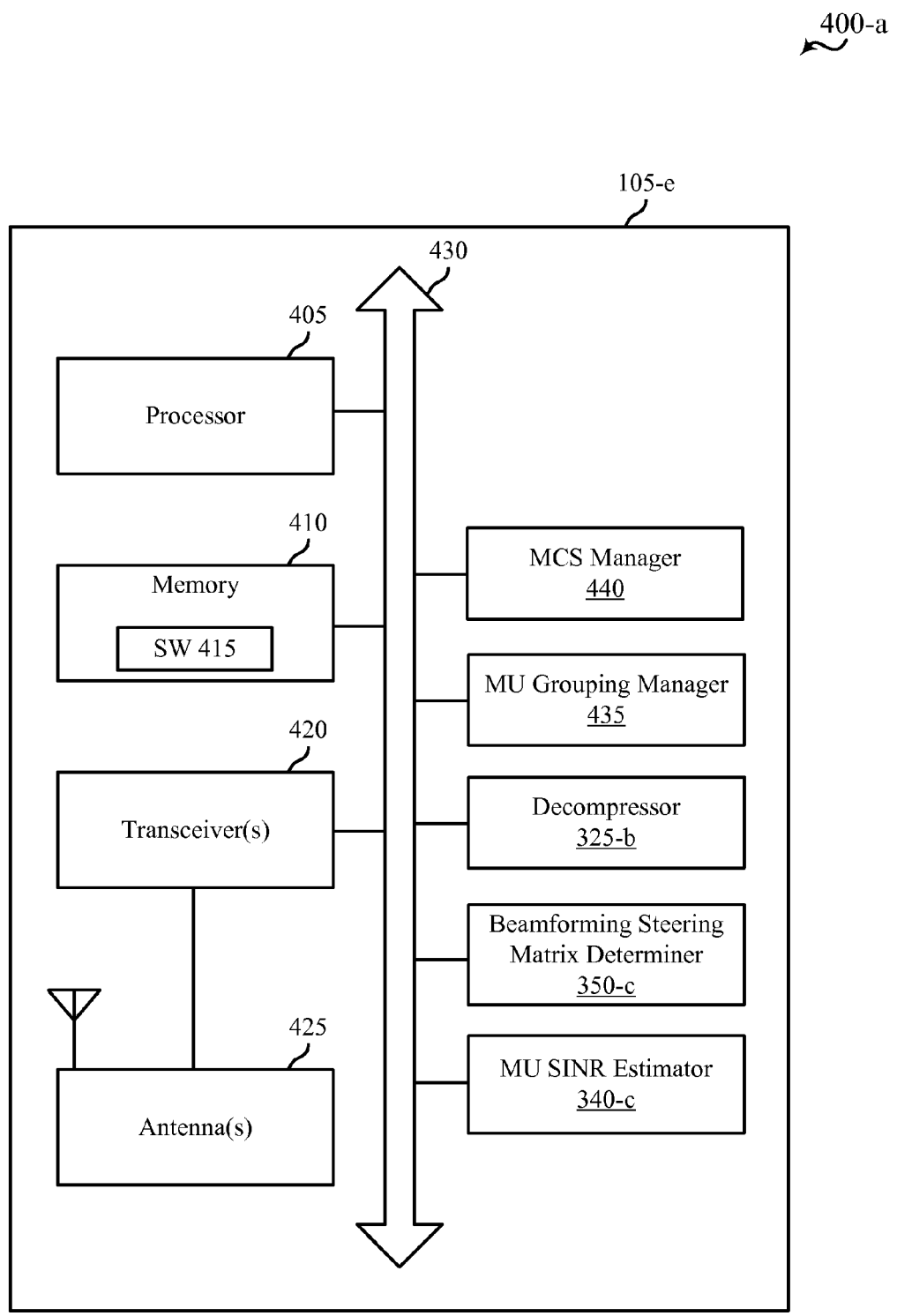
FIGS. 4A and 4B show block diagrams of examples of an AP that supports using compressed beamforming information for optimizing MIMO operations in accordance with various aspects of the present disclosure.

FIG. 4A shows a block diagram 400-*a* of an example AP 105-*e* that supports using compressed beamforming information for optimizing MIMO operations in accordance with various aspects of the present disclosure, and with respect to FIGS. 1-3C. The AP 105-*e* includes a processor 405, a memory 410, one or more transceivers 420, one or more antennas 425, an MCS manager 440, a MU grouping manager 435, a decompressor 325-*b*, a beamforming steering matrix determiner 350-*c*, and a MU SINR estimator 340-*c*. The processor 405, memory 410, transceiver(s) 420, MCS manager 440, MU grouping manager 435, decompressor 325-*b*, beamforming steering matrix determiner 350-*c*, and MU SINR estimator 340-*c* are communicatively coupled with a bus 430, which enables communication between these components. The antenna(s) 425 are communicatively coupled with the transceiver(s) 420.

The processor 405 is an intelligent hardware device, such as a central processing unit (CPU), a microcontroller, an application-specific integrated circuit (ASIC), etc. The processor 405 processes information received through the transceiver(s) 420 and information to be sent to the transceiver(s) 420 for transmission through the antenna(s) 425.

The memory 410 stores computer-readable, computer-executable software (SW) code 415 containing instructions that, when executed, cause the processor 405 or another one of the components of the AP 105-*e* to perform various functions described herein, for example, receiving compressed beamforming information for a number of STAs 110 and determining MU SINR metrics and correlation metric(s) associated with the STAs.

The transceiver(s) 420 communicate bi-directionally with other wireless devices, such as stations 110, other APs 105, or other devices. The transceiver(s) 420 include a modem to modulate packets and frames and provide the modulated packets to the antenna(s) 425 for transmission. The modem is additionally used to demodulate packets received from the antenna(s) 425.

The MCS manager 440, MU grouping manager 435, decompressor 325-b, beamforming steering matrix determiner 350-c, and MU SINR estimator 340-c implement the features described with reference to FIGS. 1-3C, as further explained below.

Again, FIG. 4A shows only one possible implementation of a device executing the features of FIGS. 1-3. While the components of FIG. 4A are shown as discrete hardware blocks (e.g., ASICs, field programmable gate arrays (FPGAs), semi-custom integrated circuits, etc.) for purposes of clarity, it will be understood that each of the components may also be implemented by multiple hardware blocks adapted to execute some or all of the applicable features in hardware. Alternatively, features of two or more of the components of FIG. 4A may be implemented by a single, consolidated hardware block. For example, a single transceiver 420 chip may implement the processor 405, MCS manager 440, MU grouping manager 435, decompressor 325-b, beamforming steering matrix determiner 350-c, and MU SINR estimator 340-c.

Figure 4B:
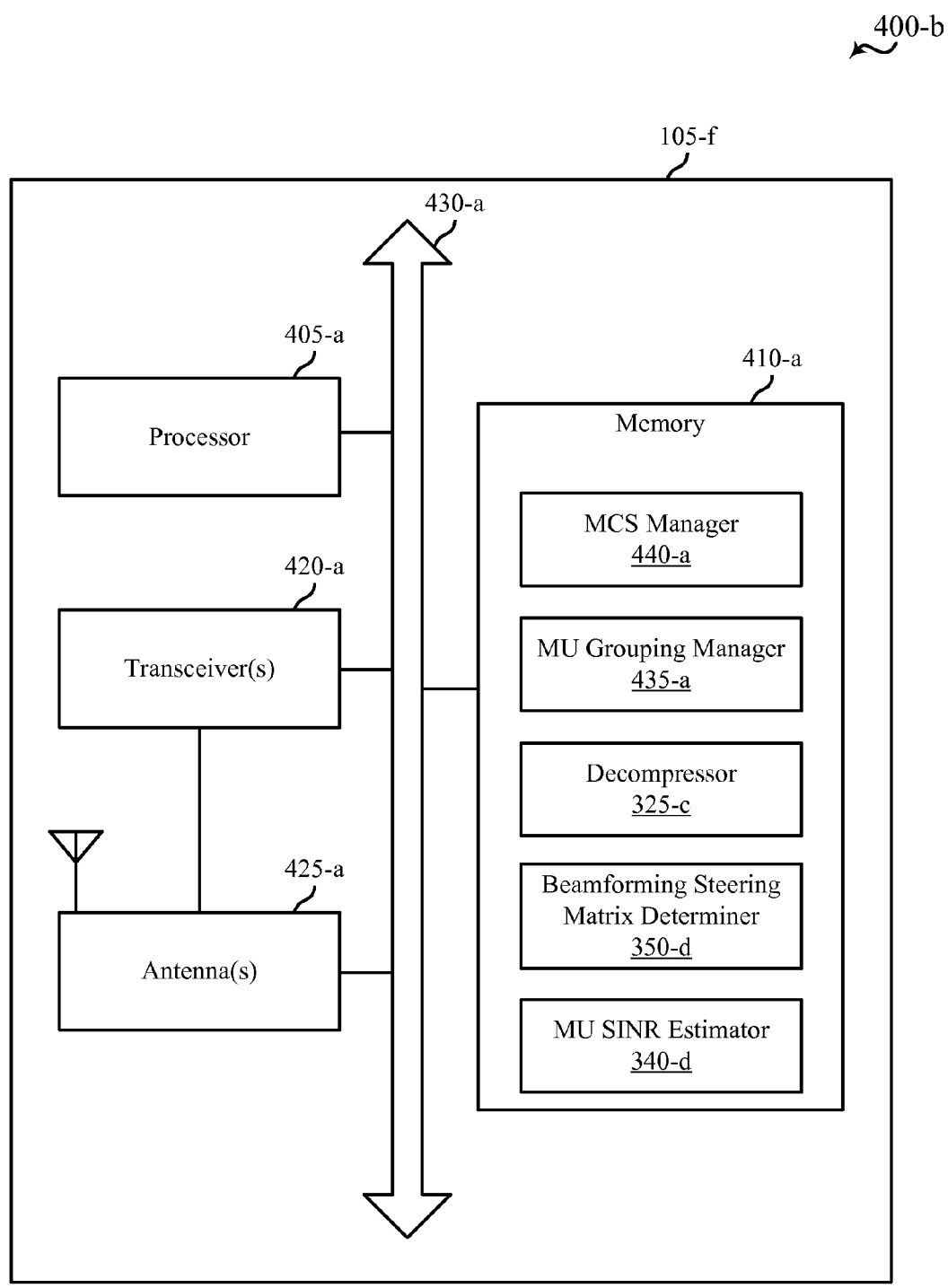

In still other examples, the features of each component may be implemented, in whole or in part, with instructions embodied in a memory, formatted to be executed by one or more general or application-specific processors. For example, FIG. 4B shows a block diagram 400-b of another example of an AP 105-f in which the features of the MCS manager 440-a, MU grouping manager 435-a, decompressor 325-c, beamforming steering matrix determiner 350-d, and MU SINR estimator 340-d are implemented as computer-readable code stored on memory 410-a and executed by one or more processors 405-a. Other combinations of hardware/software may be used to perform the features of one or more of the components of FIGS. 4A and 4B.

Figure 5:
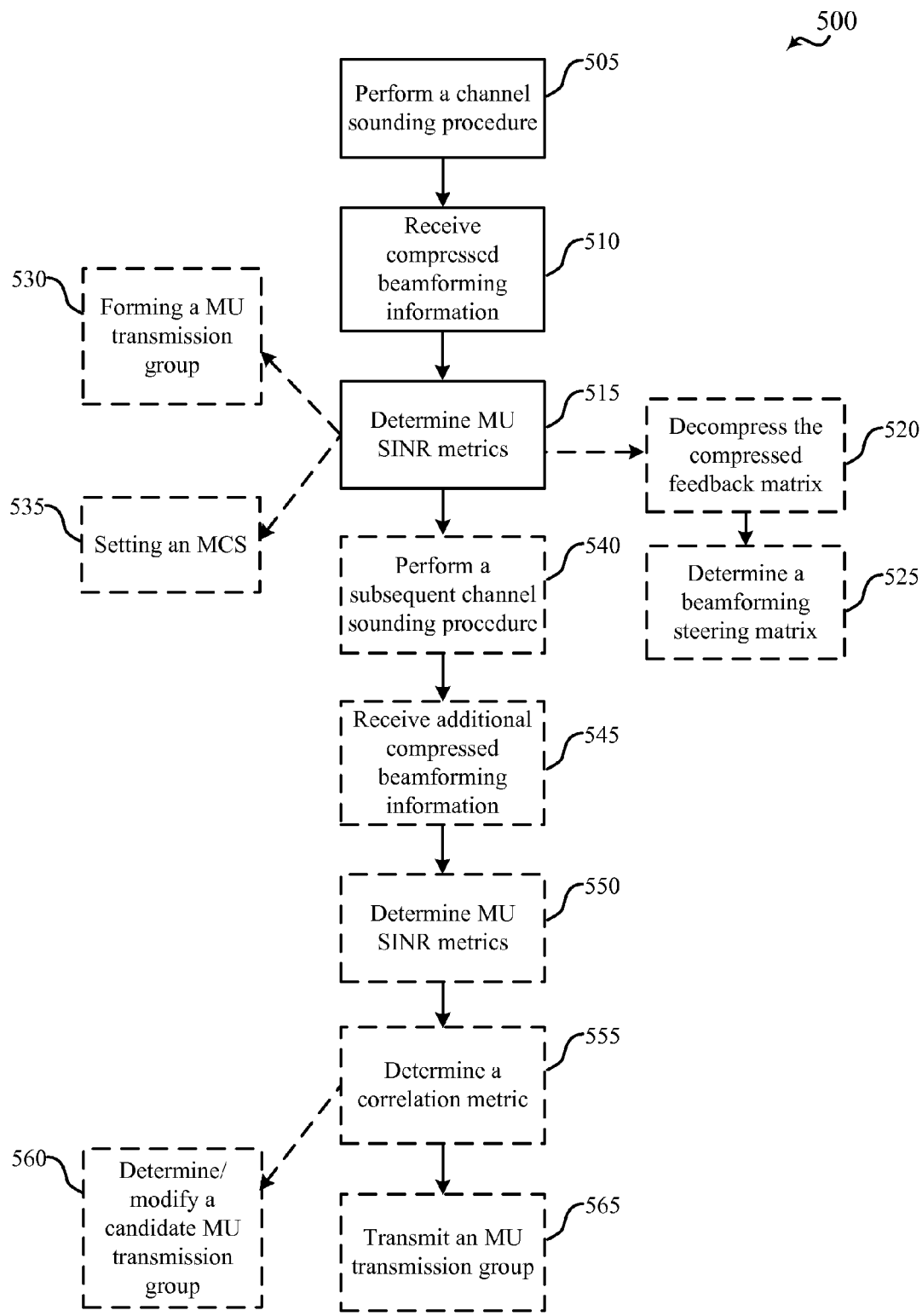
FIG. 5 shows a flow chart that illustrate examples of methods for using compressed beamforming information for optimizing MIMO operations in accordance with various aspects of the present disclosure.

FIG. 5 shows a flow chart that illustrates one example of a method 500 for using compressed beamforming information for optimizing MIMO operations in accordance with various aspects of the present disclosure. Method 500 may be performed by any of the APs 105 and STAs 110 discussed in the present disclosure, but for clarity method 500 will be described from the perspective of AP 105-e of FIG. 4A as the beamformer wireless device and the STAs 110 of FIG. 1 and referenced in FIG. 2 as the beamformee wireless devices. It is to be understood that method 500 is just one example of techniques for using compressed beamforming information, and the operations of the method 500 may be rearranged, performed by other devices and component thereof, and/or otherwise modified such that other implementations are possible.

Broadly speaking, the method 500 illustrates a procedure by which the AP 105-e receives compressed beamforming information from multiple stations, the compressed beamforming information containing a feedback SNR value and compressed feedback matrix, and determines a multi-user SINR metric for each station based at least in part on the received SNR values and the received compressed feedback matrices.

At block 505, transceiver 420 of the AP 105-e performs a channel sounding procedure. The channel sounding procedure includes the transmission of a Null Data Packet (NDP) Announcement frame to identify stations selected as beamformees. The transceiver 420 receives an acknowledgement or other response to the NDP announcement. The transceiver 420 then transmits a NDP with containing training fields that are known to the stations.

At block 510, the transceiver 420 receives compressed beamforming information from each of a plurality of stations in response to the NDP. The compressed beamforming information for each station includes a feedback signal-to-noise ratio (SNR) value and compressed feedback matrix.

At block 515, MU SINR estimator 340-c determines a multi-user signal-to-interference-plus noise ratio (SINR) metric for each of the beamformee stations based at least in part on the received feedback SNR values and the received compressed feedback matrices. The SINR metric is determined according to the principles described in FIGS. 1-3B. The AP 105-e can use the MU SINR metric for the stations in a number of ways. According to one option, at block 520, decompressor 325-b decompresses the compressed feedback matrix, and at block 525 beamforming steering matrix determiner 350-c determines a beamforming steering matrix from the decompressed feedback matrix. According to a second option, at block 530, MU grouping manager 435 forms a MU transmission group based at least in part on the determined MU SINR metrics. According to a third option, at block 535 MCS manager 440 sets an MCS for one or more of the stations based at least in part on the determined MU SINR metrics.

At block 540, transceiver 420 performs a subsequent channel sounding procedure. The subsequent channel sounding procedure is the same as or substantially similar to the channel sounding procedure of block 505. At block 545, transceiver 420 receives an additional set of compressed beamforming information from the stations selected as beamformees. At block 550, MU-SINR estimator 340-c determines additional MU SINR metrics based at least in part on the new compressed beamforming information.

At block 555, MU grouping manager 435 identifies one or more correlation metrics between stations using the MU SINR metrics from the first and second sounding procedures. Based at least in part on the correlation metric(s), at block 560, MU grouping manager 435 forms one or more new MU transmission groups or modifies one or more existing MU transmission groups. The MU grouping manager 435 takes these actions to group closely correlated stations together. At block 565, transceiver 420 transmits to an MU transmission group based at least in part on the determined MU SINR metrics.

At block 555, AP 105-e transmits a multi-user transmission group from the plurality of stations based at least in part on the determined multi-user SINR metrics.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving, by a first wireless device, compressed beamforming information from each of a plurality of stations, the compressed beamforming information including a feedback signal-to-noise ratio (SNR) value and compressed feedback matrix;
   determining, by the first wireless device, a multi-user signal-to-interference-plus noise ratio (SINR) metric for each of the plurality of stations based at least in part on the received feedback SNR values and the received compressed feedback matrices; and
   setting, by the first wireless device, a transmission rate for each of the plurality of stations based at least in part on the determined multi-user SINR metrics.

2. The method of claim 1, further comprising:
   forming a multi-user transmission group from the plurality of stations based at least in part on the determined multi-user SINR metrics.

3. The method of claim 1, wherein determining the multi-user SINR metric for each of the plurality of stations further comprises:
   determining a beamforming steering matrix based at least in part on the received SNR values and received compressed feedback matrices; and
   determining the multi-user SINR metric for each of the plurality of stations based at least in part on the determined beamforming steering matrix.

4. The method of claim 3, further comprising:
   performing a subsequent channel sounding procedure prior to performing a multi-user transmission to a multi-user transmission group formed based at least in part on an initial channel sounding procedure, the subsequent channel sounding procedure using the determined beamforming steering matrix.

5. The method of claim 1, wherein determining the multi-user SINR metric for a first station of the plurality of stations comprises using beamforming weights associated with a spatial stream to a second station of the plurality of stations.

6. The method of claim 1, further comprising:
   decompressing the compressed feedback matrices based at least in part on angles associated with the compressed feedback matrix for each of the plurality of stations.

7. A communications device, comprising:
- a transceiver to receive compressed beamforming information from each of a plurality of stations, the compressed beamforming information including a feedback signal-to-noise ratio (SNR) value and compressed feedback matrix;
- a multi-user signal-to-interference-plus-noise ratio (SINR) estimator to determine a multi-user SINR metric for each of the plurality of stations based at least in part on the received feedback SNR values and the received compressed feedback matrices; and
- a modulation and coding scheme (MCS) manager to set a transmission rate for each of the plurality of stations based at least in part on the determined multi-user SINR metrics.

8. The communications device of claim 7, further comprising:
- a multi-user grouping manager to form a multi-user transmission group from the plurality of stations based at least in part on the determined multi-user SINR metrics.

9. The communications device of claim 7, wherein the multi-user SINR estimator to determine the multi-user SINR metric for each of the plurality of stations comprises the multi-user SINR estimator to:
- determine a beamforming steering matrix based at least in part on the received SNR values and received compressed feedback matrices; and
- determine the multi-user SINR metric for each of the plurality of stations based at least in part on the determined beamforming steering matrix.

10. The communications device of claim 9, further comprising:
- a multi-user grouping manager to perform a subsequent channel sounding procedure prior to performing a multi-user transmission to a multi-user transmission group formed based at least in part on an initial channel sounding procedure, the subsequent channel sounding procedure using the determined beamforming steering matrix.

11. The communications device of claim 7, wherein the multi-user SINR estimator uses beamforming weights associated with a spatial stream to a second station of the plurality of stations to determine the multi-user SINR metrics.

12. The communications device of claim 7, further comprising:
- a decompressor to decompress the compressed feedback matrices based at least in part on angles associated with the compressed feedback matrix for each of the plurality of stations.

13. A communications device, comprising:
- means for receiving compressed beamforming information from each of a plurality of stations, the compressed beamforming information including a feedback signal-to-noise ratio (SNR) value and compressed feedback matrix;
- means for determining a multi-user signal-to-interference-plus noise ratio (SINR) metric for each of the plurality of stations based at least in part on the received feedback SNR values and the received compressed feedback matrices; and
- means for setting a transmission rate for each of the plurality of stations based at least in part on the determined multi-user SINR metrics.

14. The communications device of claim 13, further comprising:
- means for forming a multi-user transmission group from the plurality of stations based at least in part on the determined multi-user SINR metrics.

15. The communications device of claim 13, wherein the means for determining the multi-user SINR metric for each of the plurality of stations is configured to:
- determine a beamforming steering matrix based at least in part on the received SNR values and received compressed feedback matrices; and
- determine the multi-user SINR metric for each of the plurality of stations based at least in part on the determined beamforming steering matrix.

16. The communications device of claim 13, further comprising:
- means for performing a subsequent channel sounding procedure prior to performing a multi-user transmission to a multi-user transmission group formed based at least in part on an initial channel sounding procedure, the subsequent channel sounding procedure using the determined beamforming steering matrix.

17. The communications device of claim 13, wherein the means for determining the multi-user SINR metric for a first station of the plurality of stations is configured to use beamforming weights associated with a spatial stream to a second station of the plurality of stations.

18. The communications device of claim 13, further comprising:
- means for decompressing the compressed feedback matrices based at least in part on angles associated with the compressed feedback matrix for each of the plurality of stations.

19. A non-transitory computer-readable medium comprising computer-readable code that, when executed, causes a device to:
- receive compressed beamforming information from each of a plurality of stations, the compressed beamforming information including a feedback signal-to-noise ratio (SNR) value and compressed feedback matrix;
- determine a multi-user signal-to-interference-plus noise ratio (SINR) metric for each of the plurality of stations based at least in part on the received feedback SNR values and the received compressed feedback matrices; and
- set a transmission rate for each of the plurality of stations based at least in part on the determined multi-user SINR metrics.

20. The non-transitory computer-readable medium of claim 19, wherein the computer-readable code that, when executed, further causes the device to:
- form a multi-user transmission group from the plurality of stations based at least in part on the determined multi-user SINR metrics.

21. The non-transitory computer-readable medium of claim 19, wherein the computer-readable code that, when executed, causes the device to determine the multi-user SINR metric for each of the plurality of stations, further cause the device to:
- determine a beamforming steering matrix based at least in part on the received SNR values and received compressed feedback matrices; and
- determine the multi-user SINR metric for each of the plurality of stations based at least in part on the determined beamforming steering matrix.

22. The non-transitory computer-readable medium of claim 21, wherein the computer-readable code that, when executed, further causes the device to:

perform a subsequent channel sounding procedure prior to performing a multi-user transmission to a multi-user transmission group formed based at least in part on an initial channel sounding procedure, the subsequent channel sounding procedure using the determined beamforming steering matrix.

23. The non-transitory computer-readable medium of claim 19, wherein the computer-readable code that, when executed, causes the device to determine the multi-user SINR metric for each of the plurality of stations, further cause the device to determine the multi-user SINR metric for a first station of the plurality of stations comprises using beamforming weights associated with a spatial stream to a second station of the plurality of stations.

24. The non-transitory computer-readable medium of claim 19, wherein the computer-readable code that, when executed, further causes the device to:
  decompress the compressed feedback matrices based at least in part on angles associated with the compressed feedback matrix for each of the plurality of stations.

* * * * *